United States Patent
El Assaad

(10) Patent No.: US 11,749,107 B2
(45) Date of Patent: Sep. 5, 2023

(54) METHOD, APPARATUS, AND COMPUTER PROGRAM FOR DETERMINING A PLURALITY OF TRAFFIC SITUATIONS

(71) Applicant: VOLKSWAGEN AKTIENGESELLSCHAFT, Wolfsburg (DE)

(72) Inventor: Ahmad El Assaad, Wolfsburg (DE)

(73) Assignee: Volkswagen Aktiegengesellschaft

( * ) Notice: Subject to any disclaimer, the term of this patent is extended or adjusted under 35 U.S.C. 154(b) by 418 days.

(21) Appl. No.: 16/738,061

(22) Filed: Jan. 9, 2020

(65) Prior Publication Data

US 2020/0219386 A1    Jul. 9, 2020

(30) Foreign Application Priority Data

Jan. 9, 2019  (EP) ..................................... 19150971
Jan. 16, 2019 (EP) ..................................... 19152087

(51) Int. Cl.
*G08G 1/01* (2006.01)
*H04B 17/373* (2015.01)
(Continued)

(52) U.S. Cl.
CPC ........... *G08G 1/0133* (2013.01); *G06N 20/00* (2019.01); *G08G 1/012* (2013.01); *G08G 1/0116* (2013.01);
(Continued)

(58) Field of Classification Search
None
See application file for complete search history.

(56) References Cited

U.S. PATENT DOCUMENTS

| 8,717,940 B2 * | 5/2014 | Kennedy ............... H04L 41/147 370/254 |
| 9,257,041 B2 | 2/2016 | Scofield et al. |

(Continued)

FOREIGN PATENT DOCUMENTS

| CN | 102460534 A | 5/2012 |
| CN | 108428340 A | 8/2018 |

(Continued)

OTHER PUBLICATIONS

Khan et al.; QoS Assessment and Modelling of Connected Vehicle Network within Internet of Vehicles; International Journal on Advances in Software; 2018; vol. 11, No. 1 & 2; pp. 78-87.
(Continued)

*Primary Examiner* — Maceeh Anwari
*Assistant Examiner* — Charles Pall
(74) *Attorney, Agent, or Firm* — BARNES & THORNBURG, LLP

(57) ABSTRACT

An apparatus, a method, and a computer program for determining traffic situations and predicting connected services between road users and the communication quality of services between the road users. The method includes obtaining environmental perception models from road users and from road-side infrastructure entities; generating a combined environmental perception model for a pre-defined area based on environmental perception models, wherein the environmental perception models are fused within the combined environmental perception model; and predicting traffic situations within the pre-defined area over points in time in the future based on the combined environmental perception model.

23 Claims, 6 Drawing Sheets

(51) Int. Cl.
   *H04W 4/40*    (2018.01)
   *G06N 20/00*   (2019.01)
   *H04B 7/06*    (2006.01)
(52) U.S. Cl.
   CPC ......... *G08G 1/0145* (2013.01); *H04B 7/0626*
      (2013.01); *H04B 17/373* (2015.01); *H04W*
      *4/40* (2018.02)

(56) References Cited

U.S. PATENT DOCUMENTS

| | | | |
|---|---|---|---|
| 10,147,324 | B1 | 12/2018 | Kuffner, Jr. |
| 2006/0104219 | A1 | 5/2006 | Kennedy |
| 2013/0035083 | A1 | 2/2013 | Kadel |
| 2017/0314950 | A1 | 11/2017 | Tian et al. |
| 2018/0376306 | A1* | 12/2018 | Ramalho de Oliveira ................. H04W 88/10 |
| 2019/0294966 | A1* | 9/2019 | Khan .................... B60W 50/00 |
| 2020/0017117 | A1* | 1/2020 | Milton .................. B60W 50/02 |
| 2020/0029189 | A1* | 1/2020 | Fox ........................ H04W 4/40 |
| 2020/0125086 | A1* | 4/2020 | Switkes .................... B60T 7/22 |

FOREIGN PATENT DOCUMENTS

| | | |
|---|---|---|
| JP | 2003044994 A | 2/2003 |
| JP | 2008521283 A | 6/2008 |
| JP | 2008310469 A | 12/2008 |
| JP | 2010219919 A | 9/2010 |
| JP | 2010224610 A | 10/2010 |

OTHER PUBLICATIONS

Zhang et al.; Traffic Clustering and Online Traffic Prediction in Vehicle Networks: A Social Influence Perspective; 2012 Proceedings IEEE INFOCOM; 2012; pp. 495-503.
Search Report for European Patent Application No. 19152087.3; dated Jun. 28, 2019.
Office Action for Korean Patent Application No. 10-2020-0002524; dated May 26, 2021.
Office Action; Chinese Patent Application No. 202010021366.2; dated Dec. 23, 2022.

* cited by examiner

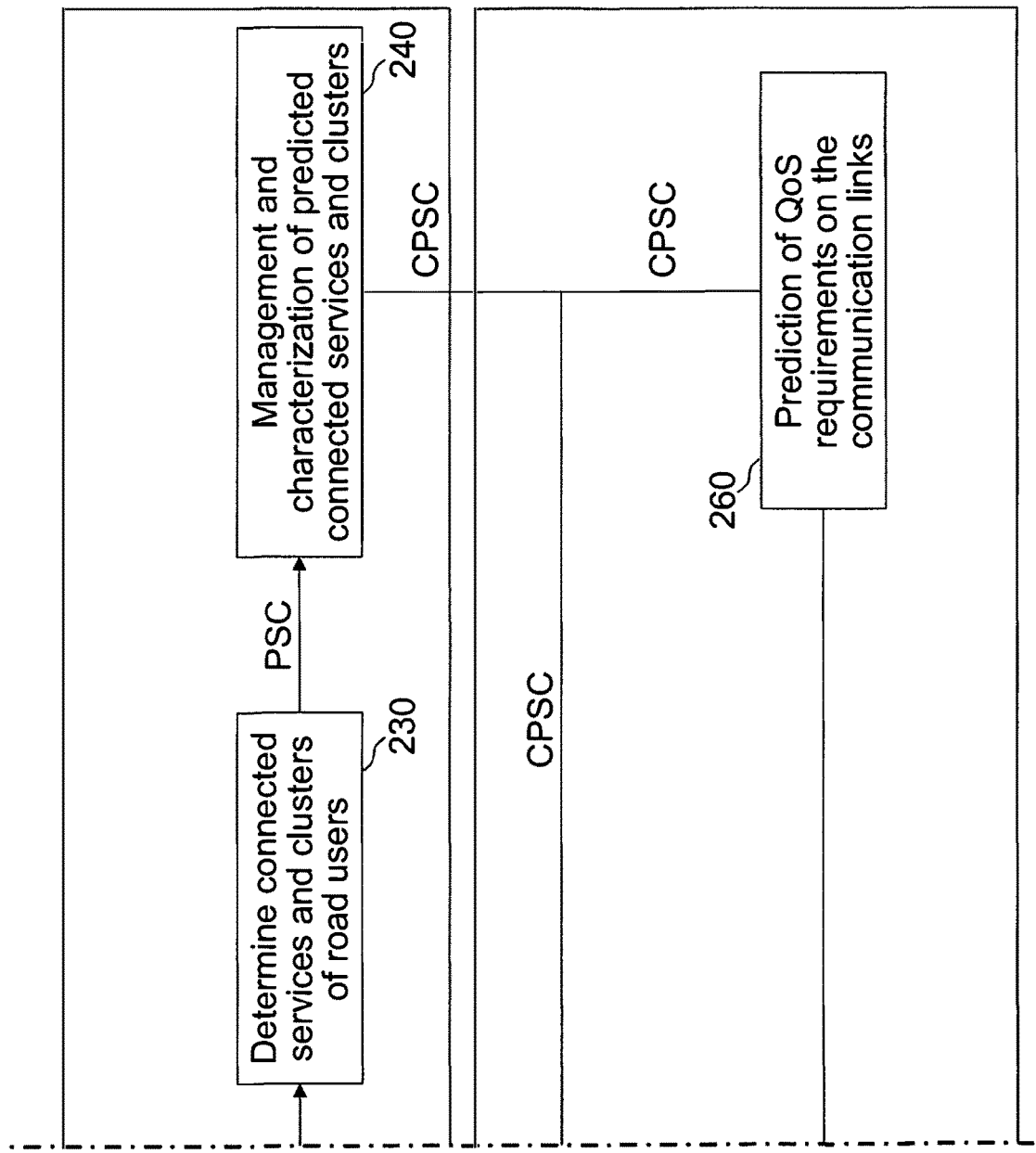

METHOD, APPARATUS, AND COMPUTER PROGRAM FOR DETERMINING A PLURALITY OF TRAFFIC SITUATIONS

PRIORITY CLAIM

This patent application claims priority to European Patent Application Nos. 19150971.0, filed 9 Jan. 2019, and 19152087.3, filed 16 Jan. 2019. the disclosures of which are incorporated herein by reference in their entireties.

SUMMARY

Illustrative embodiments relate to an apparatus, a method and a computer program for determining a plurality of traffic situations, more specifically, but not exclusively, to determining a plurality of traffic situations based on a combination of a plurality of environmental perception models that are obtained from a plurality of road users.

BRIEF DESCRIPTION OF THE DRAWINGS

Disclosed embodiments will be described with reference to the accompanying figures, in which:

FIGS. 2A and 2B show a schematic diagram of an information flow in a service prediction and clustering of road users and of a prediction of quality of service on communication links.

DETAILED DESCRIPTION

Figure 1A:
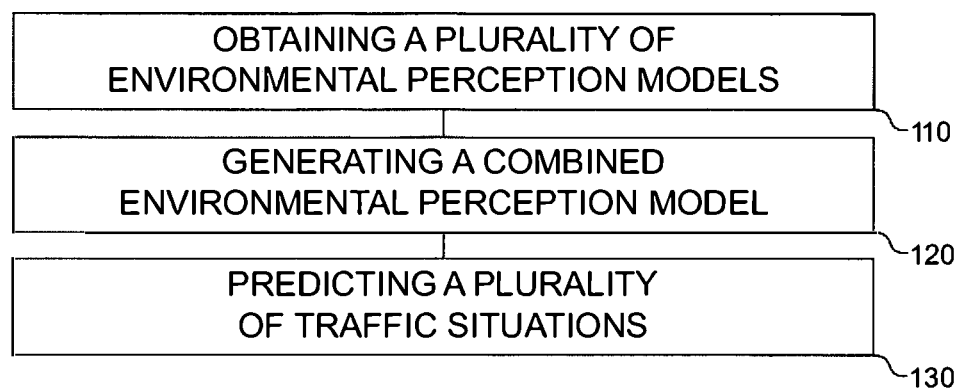
FIGS. 1A and 1B show flow charts of embodiments of a method for predicting a plurality of traffic situations.

Vehicular communication is a field of research and development. To enable an autonomous or semi-autonomous driving of the transportation vehicles, transportation vehicles are expected to use Vehicle-to-Vehicle-Communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems. As wireless communication occurs over a shared medium, which may be limited by the availability of radio resources, there may be a desire to provide an improved concept for radio resource management in vehicular communication.

U.S. Pat. No. 10,147,324 B1 relates to the provision of user assistance in a transportation vehicle based on traffic behavior models. In the disclosure, transportation vehicles generate sensor data and use it to gather information about other transportation vehicles and objects surrounding the transportation vehicles. This information may be used together with like information from detection vehicles and from a roadway sensor system. The system generates a traffic behavior model, which describes a predominating traffic behavior of reference objects, such as other transportation vehicles.

US patent application US 2006/0104219 A1 relates to predictive mobile ad hoc networking. In the patent application, network services that are likely to be required are predicted and used to pre-emptively adjust the network.

US patent application US 2018/0376306 A1 relates to method and system for detecting anomalies and forecasting optimizations to improve urban living management using networks of autonomous transportation vehicles.

Disclosed embodiments are based on the finding that, to conduct resource management in vehicular communication, it may be useful to predict traffic situations that occur within a pre-defined area, for which the resource management is to be provided. This pre-defined area may, e.g., overlap with a coverage area of a base station of a mobile communication system. Within the pre-defined area, two kinds of wireless communications may be considered: Communication between road users (i.e., transportation vehicles, such as cars, motorbikes or bicycles, or pedestrians) and the base station (i.e., Vehicle-to-Network-Communication) and communication between road users (i.e., Vehicle-to-Vehicle-Communication). As, in at least some vehicular communication approaches, the same radio resource are used for both V2V and V2N communication, a joint radio resource management may be used. Disclosed embodiments use environmental perception models that are generated by a plurality of road users to construct a combined environmental perception model that covers the pre-defined area. Using the combined model, traffic situations that can be foreseen using the combined environmental perception model are predicted over multiple points of time in the future. In this context, traffic situations may be situations that involve more than one road user, i.e., traffic situations that require communication between connected road users. Such a traffic situation may, e.g., a situation in which a road user communicates with further road users to coordinate a merging of the road user onto a road, or a traffic situations, in which multiple transportation vehicles coordinate, which of the transportation vehicles enters the crossroads first. Another exemplary traffic situation is a situation, in which a road user uses a tele-operated driving service. Each traffic situation may lead to a communication pattern that statistically occurs between road users that participate in the traffic situation, e.g., communication between the road users that participate in the traffic situation and communication of the road users with a backend server. Once the traffic situations are predicted, they may be used to predict the kind, amount and location of communication over the points of time in the future. Using the predicted communication, a pre-allocation of radio resources may be performed, and a prediction of a Quality of Service (QoS) may be performed. Additionally, the predicted traffic situations may further be used to group road users into clusters of road users, as predicted traffic situations may often involve road users that are located in the same vicinity and drive at a similar pace.

Disclosed embodiments provide a method for predicting a plurality of traffic situations. The method comprises obtaining a plurality of environmental perception models from a plurality of road users (i.e., transportation vehicles or motorbikes) and (optionally) from a plurality of road-side infrastructure entities. The method further comprises generating a combined environmental perception model for a pre-defined area based on the plurality of environmental perception models. The plurality of environmental perception models are fused within the combined environmental perception model. The method further comprises predicting a plurality of traffic situations within the pre-defined area over a plurality of points in time in the future based on the combined environmental perception model.

Fusing the individual environmental perception models of the plurality of road users may enable creating a combined perception model for the pre-defined area, e.g., without requiring dedicated sensors to monitor the pre-defined area. The combined perception model may be used to predict the traffic situations, which may in turn be used for radio resource management and grouping of road users into clusters of road users. The combined environmental perception model may be exploited in the prediction of connected services between road users. The prediction of connected services may enable the prediction of road user clusters and communication links between the clusters. The prediction of communication links may enable the pre-allocation of resources on the predicted communication links for the predicted connected services based on the predicted traffic situations in the pre-defined area. The pre-allocation of resources may enable the prediction of communication quality of the predicted communication links using predicted channel states on the predicted communication links.

In at least some disclosed embodiments, the method further comprises obtaining information related a plurality of planned maneuvers of the plurality of road users. The combined environmental perception model may be generated based on the information related the plurality of planned maneuvers. This may increase an accuracy of the prediction of the traffic situations as the imminent maneuvers of the plurality of road users are taken into account.

The method may further comprise obtaining information related to a plurality of planned routes of the plurality of road users. The combined environmental perception model may be generated based on the information related the plurality of planned routes. This may further increase an accuracy of the prediction of the traffic situations as the routes, and therefore lanes and/or road exits taken by the plurality of road users, are taken into account.

In disclosed embodiments, the plurality of environmental perception models comprise modeling information for an area surrounding the plurality of road users. The modeling information may relate to objects that have been identified by the plurality of road users using perception sensors of the plurality of road users. The plurality of environmental perception models may provide a high-level abstraction of the objects perceived by the plurality of road users, which may be easier to fuse to generate the combined environmental perception model.

In various disclosed embodiments, the method further comprises grouping the plurality of road users into a plurality of clusters of road users based on the predicted plurality of traffic situations. The road users may be notified of the clustering, which may enable them to use required connected services, which are in turn enabled via direct communication within the clusters, which may in turn reduce an amount of V2N communication. The prediction of traffic situations may determine the needed connected services between transportation vehicles and between transportation vehicles and other road users within the built clusters. The clusters may be built based on the needed connected services within a time span and pre-defined locations. A cluster may comprise different types of road users, e.g., transportation vehicles, pedestrian, cyclist, etc. The determination of clusters using connected services may define the communication links between the road users in the clusters, e.g., V2V and/or V2N. For example, a communication between a transportation vehicle and a pedestrian may be carried out via direct communication (V2V or pedestrian case V2P (Vehicle to pedestrian)) or through the mobile radio network via V2N. Furthermore, as this communication is highly localized, the radio resources required for the communication within the cluster can be re-used in other clusters as well.

The method may further comprise determining information related to a prediction of communication links between road users (e.g., communication links between road users within a cluster of the plurality of clusters, which may be derived from the predicted connected services, which are determined based on the plurality of traffic situations) in the plurality of traffic situations based on the predicted plurality of traffic situations. The predicted communication links may be used to estimate the required radio resources. The predicted communication links may include information related to the type of links within the clusters, e.g., V2V and/or V2N, to the communication frequency and end-to-end path description, the required data rate and communication latency between the communication partners on the links. The predicted communication links may be used to estimate the required radio resources.

Consequently, the method may comprise determining information related to radio resources required for the predicted communication links based on the information related to the prediction of the communication links. The required radio resources may be used in the planning and/or pre-allocation of radio resources.

For example, the method may comprise determining information related to vehicular communication services (i.e., connected transportation vehicle communication services, or short connected services; Connected services may be left turning assist at a crossing, overtake assist at rural road, etc.; Connected services may be connected functions which require communications between road users/transportation vehicles to enable the service functions) that are required by road users that are involved in the plurality of traffic situations. The information related to the radio resources required for the predicted communication links may be determined based on the information related to the vehicular communication services that are required by the road users that are involved in the plurality of traffic situations. The vehicular communication services that are required by road users that are involved in the plurality of traffic situations may be used to derive the radio resources required for the predicted communication links.

The method may comprise determining a resource planning of radio resources within the pre-defined area based on the required radio resources. The resource planning may be used to avoid situations, in which road user communication is limited by a lack of available radio resources.

In at least some disclosed embodiments, the communication links between the road users in the plurality of traffic situations comprises vehicle-to-vehicle-communication links and vehicle-to-network-communication links. By taking both V2V and V2N communication into account, a more efficient resource allocation may be conducted.

The method may comprise determining information related to an estimated quality of service of the predicted communication links based on the predicted communication links, based on information related to available radio resources within the pre-defined area, and (optionally) based on predicted channel state information on the predicted communication links between the road users within the pre-defined area. If this information is communicated to the road users, they may adjust their communication to match the available radio resources.

In at least some disclosed embodiments, the information related to the prediction of the communication links between the road users in the plurality of traffic situations is determined using a machine-learning algorithm. Information related to the plurality of traffic situations may be used as input to the machine-learning algorithm. This may enable a determination of correlations between traffic situations and vehicular communication that might not be derivable using other models.

In various disclosed embodiments, the method is executed by a computing entity located at a base station of a mobile communication system. A coverage area of the base station might at least partially overlap with a part of the pre-defined area. This may decrease a delay and an overall use of bandwidth in the core network of the mobile communication system, as the relevant information is calculated in-situ.

The determination of the information related to vehicular communication services that are required by road users that are involved in the plurality of traffic situations may comprise one or more elements of a group of a determination of the road users that are involved in the plurality of traffic situations, a determination of vehicular communication services that are required by the road users that are involved in the plurality of traffic situations, and a determination of a time and place of the vehicular communication services that are required by the road users that are involved in the plurality of traffic situations. This may enable a fine-grained determination of the radio-resources required for the vehicular communication services.

In some disclosed embodiments, the method comprises determining a desired quality of service for the predicted communication links, wherein the radio resources required for the predicted communication are determined based on the desired quality of service for the predicted communication links. The desired quality of service for the predicted communication links may define minimal and/or optimal requirements of the predicted communication, e.g., regarding a maximal tolerable delay or regarding a minimal required bandwidth.

Disclosed embodiments further provide a computer program having a program code for performing the method, when the computer program is executed on a computer, a processor, or a programmable hardware component.

Disclosed embodiments further provide an apparatus for predicting a plurality of traffic situations. The apparatus comprises at least one interface for communicating with a plurality of road users and for communicating with a plurality of road-side infrastructure entities. The apparatus comprises a control module. The control module is configured to obtain a plurality of environmental perception models from the plurality of road users and (optionally) from the plurality of road-side infrastructure entities via the at least one interface. The control module is configured to generate a combined environmental perception model for a pre-defined area based on the plurality of environmental perception models. The plurality of environmental perception models are fused within the combined environmental perception model. The control module is configured to predict a plurality of traffic situations within the pre-defined area over a plurality of points in time in the future based on the combined environmental perception model.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

A reliable prediction of communication quality of service for V2N and direct communications links might not be sufficiently covered in research. Especially, the prediction of connected services by road users/road users in time and location might still be open. Hence a reliable concept for pre-allocation of resources based on QoS requirements of predicted services might also be in need of improvement. The challenge might still be open since the usage of connected services in road users is previously unpredicted or is difficult to predict since the service discovery and neighboring discovery processes are carried out (always) when the services are used and since the traffic situations and the environmental conditions often are not considered.

Figure 1B:
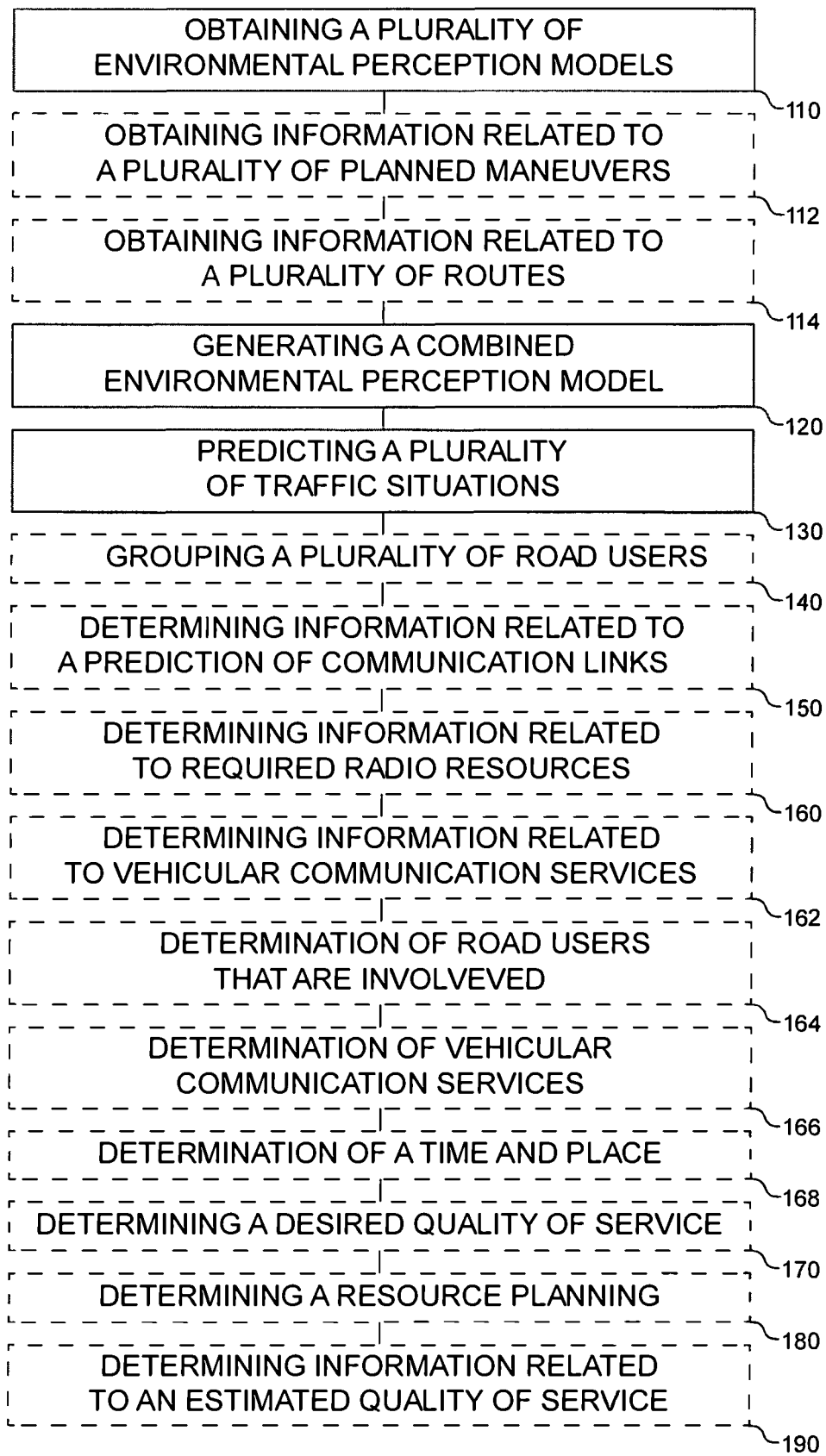

FIGS. 1a and 1b show flow charts of disclosed embodiments of a method (e.g., a computer-implemented method) for predicting a plurality of traffic situations. The method comprises obtaining 110 a plurality of environmental perception models from a plurality of road users (i.e., transportation vehicles or motorbikes). Furthermore, the plurality of environmental perception models may be obtained from a plurality of road-side infrastructure entities, e.g., from infrastructure sensors such as cameras in urban areas, which may perceive pedestrians in the pre-defined area. The method further comprises generating 120 a combined environmental perception model for a pre-defined area based on the plurality of environmental perception models. The plurality of environmental perception models are fused within the combined environmental perception model. The method further comprises predicting 130 a plurality of traffic situations within the pre-defined area over a plurality of points in time in the future based on the combined environmental perception model.

Figure 1C:
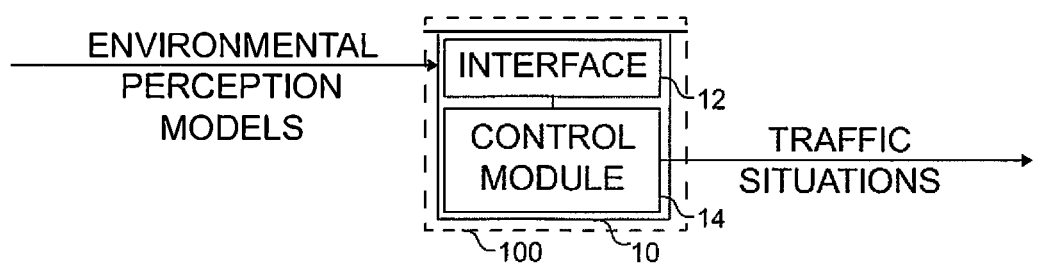
FIG. 1C shows a block diagram of an embodiment of an apparatus for predicting a plurality of traffic situations.

FIG. 1c shows a block diagram of a disclosed embodiment of an (corresponding) apparatus 10 for predicting a plurality of traffic situations. The apparatus 10 comprises at least one interface 12 for communicating with a plurality of road users and for communicating with a plurality of road-side infrastructure entities. The apparatus comprises a control module 14, coupled to the at least one interface 12. The control module 14 may be configured to execute the method introduced in connection with FIGS. 1a and/or 1b, e.g., in conjunction with the at least one interface. The control module 14 is configured to obtain a plurality of environmental perception models from the plurality of road users and (optionally) from the plurality of road-side infrastructure entities via the at least one interface 12. The control module 14 is further configured to generate a combined environmental perception model for a pre-defined area based on the plurality of environmental perception models. The plurality of environmental perception models are fused within the combined environmental perception model. The control module 14 is configured to predict a plurality of traffic situations within the pre-defined area over a plurality of points in time in the future based on the combined environmental perception model. FIG. 1c further shows a computing entity 100 comprising the apparatus 10. In at least some disclosed embodiments, the computing entity 100 may be an edge computing entity or a V2X computing entity, i.e., the computing entity may be co-located with a base station of a mobile communication system or with a road-side infrastructure entity. Disclosed embodiments provide the base station of the mobile communication system comprising the computing entity 100 with the apparatus 10.

The following description relates to both the method of FIGS. 1a and/or 1b and the apparatus of FIG. 1c.

Disclosed embodiments relate to a method and/or an apparatus for predicting a plurality of traffic situations. In vehicular communication, the prediction of traffic situations may be useful for predicting, which communications are likely to occur within the pre-defined area. For example, in connected driving, each traffic situations may cause a specific communication pattern. If, for example, a connected road user intends to make a left turn, the road user may communicate with other connected road users to ask them to give way for the left-turning road user. In another example, a connected road user may use a tele-operated driving service. This communication may follow a pattern that may be used to predict road users that are involved in this communication, an amount of communication required, and Quality of Service (QoS) requirements of the communication. To predict the traffic situations, disclosed embodiments are based on generating a combined environmental perception model from a plurality of environmental perception models of a plurality of road users (and optionally at least one of information related a plurality of planned maneuvers of the plurality of road users, information related to a plurality of planned routes of the plurality of road users and environmental perception models that originate from roadside infrastructure entities). This slew of information may be combined (i.e., "fused") to generate a combined model, which models the position and movement of road users within the pre-defined area over the plurality of points in time. Based on the position and movement of the road users, the traffic situations may be predicted, which may subsequently be used for the prediction of the communication patterns. In at least some disclosed embodiments, an execution of the method and/or of the functional components of the apparatus may be based on a request of a road user.

The method comprises obtaining 110 (e.g., receiving) a plurality of environmental perception models from a plurality of road users (and/or from a plurality of road-side infrastructure entities). In some cases, the plurality of environmental perception models might be obtained from only one of the two sources, e.g., only from the plurality of road users or only from the plurality of road-side infrastructure entities. For example, the plurality of environmental perception models may be obtained (e.g., received) through Cooperative Perception Messages (CPMs). In other words, a CPM may comprise an environmental perception model of a road user. The content of a CPM may be an environmental perception model. Consequently, the method may comprise obtaining a plurality of CPMs from the plurality of road users (and/or from the plurality of road-side infrastructure entities).

The method may comprise requesting the plurality of environmental perception models from the plurality of road users and (optionally) from the plurality of road-side infrastructure entities, e.g., via the mobile radio network (e.g., the mobile communication system). The request may be based on or comprise a planned route of a road user of the plurality of road users, e.g., based on the information related to the plurality of planned routes. The planned route may correspond to the pre-defined area. For example, the plurality if environmental perception models may be requested such, that the combined environmental perception model may be generated along the route. The request may specify a desired update rate for the plurality of environmental perception models. The plurality of environmental perception models may be provided by the plurality of road users and (optionally) by the plurality of road-side infrastructure entities, e.g., at the desired update rate.

For example, the plurality of environmental perception models may comprise modeling information for an area surrounding the plurality of road users (and/or surrounding the plurality of road-side infrastructure entities). The environmental perception models may comprise information related to the static, e.g., buildings, road signs, etc. and dynamic objects, e.g., pedestrians, cyclists, etc., around the road user/transportation vehicle. This information may be generated by an environmental model perceived by the transportation vehicles and by infrastructure. The modeling information may relate to objects that have been identified by the plurality of road users using perception sensors of the plurality of road users (similar for road-side infrastructure entities). For example, the perception sensors of the may comprise at least one of a RADAR (Radio Detection and Ranging, in the following denoted "radar") sensor, a LIDAR (Light Detection and Ranging, in the following denoted "lidar") sensor, a camera sensor and an ultrasound sensor. An environmental perception model of the plurality of environmental perception models might not comprise the respective sensor data, but might correspond to a high-level abstraction of the sensor data of the perception sensors of the plurality of road users (and/or of the plurality of road-side infrastructure entities). For example, an environmental perception model of the plurality of environmental perception models may comprise information related to a position and/or of an extent of the objects that have been identified by the plurality of road users (and/or by the plurality of road-side infrastructure entities) using perception sensors of the plurality of road users (and/or of the plurality of road-side infrastructure entities). In some disclosed embodiments, an environmental perception model of the plurality of environmental perception models may comprise information related to an identifier of the objects that have been identified by the plurality of road users (and/or by the plurality of road-side infrastructure entities) using perception sensors of the plurality of road users (and/or of the plurality of road-side infrastructure entities), e.g., if the objects are connected road users (i.e., if the objects are road users that communicate with the plurality of road users).

In some disclosed embodiments, at least some environmental perception models of the plurality of environmental perception models may be obtained from a plurality of road-side infrastructure entities. In other words, the plurality of environmental perception models may be obtained 110 from the plurality of road users and from a plurality of road-side infrastructure entities. The plurality of environmental perception models may originate from the plurality of road users and from a plurality of road-side infrastructure entities. For example, the plurality of road-side infrastructure entities may comprise at least one of a traffic light, a traffic velocity meter, a traffic control station and a toll bridge.

In at least some disclosed embodiments, the plurality of road users or the further plurality of road users may be connected road users (e.g., connected transportation vehicles), i.e., autonomous road users (i.e., autonomous transportation vehicles) or semi-autonomous road users (i.e., semi-autonomous transportation vehicles) that are configured to communicate with other road users or with a backend server to make their driving decisions. For example, the plurality of road users or the further plurality of road users may be road users that are configured to coordinate their autonomous or semi-autonomous driving with other road users or with a backend server.

In addition, as shown in FIG. 1b, the method may comprise obtaining (e.g., receiving) 112 information related a plurality of planned maneuvers of the plurality of road users. For example, the information related to the plurality of planned maneuvers may be obtained through Maneuver Coordination Messages (MCMs). For example, the method may comprise obtaining a plurality of MCMs from the plurality of road users, wherein the plurality of MCMs comprise or indicate the information related to the plurality of planned maneuvers. For example, each MCM may comprise information related to a (single) planned maneuver of the plurality of planned maneuvers. The information related to the plurality of planned maneuvers may be transmitted by the plurality of road users. The information related to the plurality of planned maneuvers of the plurality of road users may indicate, which driving maneuvers (i.e., lane changes, turns, overtaking maneuvers etc.) the plurality of road users are planning to undertake (i.e., within the next at most 30 seconds). Accordingly, a planned driving maneuver of the plurality of planned driving maneuver may be an (imminent) driving maneuver that a road user of the plurality of road users is planning to execute within at most 30 s (or within at most 25 s, at most 20 s, at most 15 s, at most 10 s) (e.g., after obtaining the information related to the driving maneuver).

In at least some disclosed embodiments, the method further comprises obtaining 114 information related to a plurality of planned routes of the plurality of road users. In contrast with the plurality of planned maneuvers, the plurality of planned routes may comprise information related to a plurality of planned destinations of the plurality of road users, i.e., long-term routes of the plurality of road users. For example, the plurality of planned routes may indicate a plurality of roads the plurality of road users are intending to travel along the plurality of routes. For example, the information related to the plurality of planned routes of the plurality of road users may indicate which lanes or road exits the plurality of road users are planning to use.

The method comprises generating 120 a combined environmental perception model for a pre-defined area based on the plurality of environmental perception models. For example, the combined environmental perception model may be generated based on the information related to the plurality of planned maneuvers and/or based on the information related the plurality of planned routes. The plurality of environmental perception models, the information related to the plurality of planned maneuvers and/or the information related the plurality of planned routes may be fused within the combined environmental perception model. For example, the pre-defined area may comprise a road, e.g., (exactly) one road or a plurality of roads. The combined environmental perception model may model at least a position and a movement of road users (which may be pedestrians as well) that occupy the road or the plurality of roads. Consequently, the combined environmental perception model may comprise information related to a position and a movement of (all of) the road users (or transportation vehicles) that occupy the road/plurality of roads. To achieve that, the generation 120 of the combined environmental perception model may comprise merging (i.e., "fusing") the individual environmental perception models into a single combined environmental perception model, e.g., by overlaying the individual environmental perception models. Additionally, the generation 120 of the combined environmental perception model may comprise combining the merged (or fused) environmental perception models with the information related the plurality of planned maneuvers and/or the information related the plurality of planned routes, i.e., to take into account the driving intentions of the plurality of road users. The method may comprise determining information related to driving intentions of the plurality of road users based on the information related to the plurality of planned maneuvers and/or based on the information related the plurality of planned routes. The generation 120 of the combined environmental perception model may comprise adding the information related to the driving intentions of the plurality of road users to the merged (or fused) environmental perception models. The combined environmental perception model may be provided to a road user, e.g., via the mobile radio network (e.g., the mobile communication system), at a suitable update rate and/or upon request of the road user. In other words, the method may comprise providing the combined environmental perception model to a road user, e.g., upon request of the road user. In some disclosed embodiments, the combined environmental perception model may be provided to the road user with a confidence indicator for the combined environmental perception model.

The combined environmental perception model is generated 120 for the pre-defined area. For example, the pre-defined area may be stretch along a road (or along a plurality of roads). For example, the pre-defined area may be based on a pathway of the road (or of the plurality of roads). For example, the pre-defined area may be based on a coverage area of a mobile communication system, e.g., based on a coverage area of one or more base stations of the mobile communication system. This locality of the information may be used to decrease a latency in the generation of the combined environmental perception model. For example, the method may be executed by a computing entity (e.g., a server) located at a base station of the mobile communication system. For example, the method may be executed by a road traffic ecosystem computing entity. Information that is provided using the method may be provided by the computing entity located at a base station of the mobile communication system and/or the road traffic ecosystem computing entity. A coverage area of the base station may at least partially overlap with a part of the pre-defined area. For example, the coverage area of the base station may correspond to the pre-defined area. Alternatively, the pre-defined area may comprise the coverage area of the base station. For example, the mobile communication system may be a vehicular communication system, e.g., a transportation vehicle-to-network (V2N) communication system. For example, the mobile communication system may be or may be based on a C-V2X (Cellular-Vehicle-to-Anything, which may comprise Long Term Evolution Vehicle-to-Anything, LTE-V2X, and 5th generation mobile communication system V2X, 5G-V2X) mobile communication system. The mobile communication system may support two communication modes: PC5, which is used between road users, and Uu, which is used between road users and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. The direct vehicle-to-vehicle communication may be based on the same radio resources (e.g., the same frequency resources) as the communication via the base station of the road user. Consequently, there may be a joint planning of the radio resources for the direct vehicle-to-vehicle communication and for the communication via the base station.

The method comprises predicting 130 a plurality of traffic situations within the pre-defined area over a plurality of points in time in the future based on the combined environmental perception model. For example, the plurality of traffic situations may correspond to traffic situations that involve more than one road user, i.e., traffic situations that require communication between connected road users (i.e., connected transportation vehicles). For example, a traffic situation may be a situation that involves two or more road users, wherein the situation requires or benefits from a cooperation of the two or more road users. In at least some disclosed embodiments, the pre-defined area may comprise a further plurality of road users, which may comprise the plurality of road users and a plurality of further road users (i.e., further road users not actively contributing to the plurality of environmental perception models). Both road users of the plurality of road users and of the plurality of further road users may be involved in traffic situations of the plurality of traffic situations. The plurality of further road users might not actively contribute to the plurality of environmental perception models, but may be modeled within the plurality of environmental perception models, e.g., by the models created by the plurality of road users. The prediction 130 of the plurality of traffic situations may comprise predicting a position and a movement of the further plurality of road users (or of the plurality of road users) over the plurality of points in time using the combined environmental perception model. For example, the plurality of points in time may stretch at least 5 seconds (or at last 8 seconds, at least 10 seconds) and/or at most 20 seconds (or at most 15 seconds, at most 10 seconds) into the future. The prediction of the position and movement of the further plurality of road users (or of the plurality of road users) over the plurality of points in time may be used to recognize the plurality of traffic situations, e.g., using a machine-learning algorithm with the (prediction of) the position and movement of the further plurality of road users (or of the plurality of road users) as input.

In at least some disclosed embodiments, the combined environmental perception model and/or the determined plurality of traffic situations may be continuously updated. For example, the method may comprise continuously obtaining (i.e., receiving) 110 the plurality of environmental perception models from the plurality of transportation vehicles and (optionally) from the plurality of road-side infrastructure entities. The method may comprise continuously updating the combined environmental perception model based on the continuously obtained plurality of transportation vehicles. In this context, "continuously obtaining the plurality of environmental perception models" means, that in periodic or aperiodic time intervals, new versions of the plurality of environmental perception models are obtained from the plurality of road users and (optionally) from the plurality of road-side infrastructure entities. These newly obtained new versions of the plurality of environmental perception models are based on updated version of the environmental perception sensor date of the plurality of road users and (optionally) of the plurality of road-side infrastructure entities. The combined environmental perception model may be updated based on the updated versions of the plurality of environmental perception modules, e.g., periodically updated or updated upon reception of a new version of an environmental perception model. Accordingly, updated version of the information related to the plurality of planned maneuvers and/or of the information of the plurality of planned routes may be continuously obtained (e.g., received), and used for (continuously) updating the combined environmental perception model. The method may further comprise (continuously) updating the plurality of traffic situations based on the continuously updated combined environmental perception models.

The plurality of traffic situations may be used to group the road users together, e.g., to form communication clusters within the plurality of road users. The method may comprise grouping 140 the plurality of road users (or the further plurality of road users) into a plurality of clusters of road users based on the predicted plurality of traffic situations. Additionally, the plurality of clusters may comprise road users of the plurality of further road users, e.g., if the road users of the plurality of further road users are connected road users. A cluster of road users may comprise road users that travel in close proximity and at a similar pace. For example, a cluster of road users may comprise road users that drive in a cooperative manner. The grouping 140 of the plurality of road users (or the further plurality of road users) into a plurality of clusters of road users may group road users into the same cluster that are predicted to participate in the same traffic situation and/or that are predicted to communicate (e.g., using the same connected services) within the pre-defined area. In some disclosed embodiments, the method may further comprise adjusting and/or managing the grouping of the plurality of road users into the plurality of clusters of road users, e.g., by registering and de-registering road users of the plurality of road users in and/or from the plurality of clusters of road users.

In various disclosed embodiments, the method comprises determining 150 information related to a prediction of (vehicular) communication links (e.g., a prediction of transportation vehicle communication) in the plurality of traffic situations based on the predicted plurality of traffic situations. The information related to the prediction/predicted communication links may be provided to a road user, e.g., via the mobile radio network (e.g., the mobile communication system), at a suitable update rate and/or upon request of the road user. In other words, the method may comprise providing the information related to the prediction/predicted communication links to a road user, e.g., upon request of the road user. The communication links between the road users in the plurality of traffic situations may comprise vehicle-to-vehicle-communication links and vehicle-to-network-communication links. The communication pattern may comprise both vehicle-to-vehicle communication (i.e., direct communication between road users without involvement of a base station) and vehicle-to-network communication (e.g., communication of the road users with a backend server, e.g., with a remote driving server). Each traffic situation of the plurality of traffic situation may be associated with a (statistical or deterministic) communication pattern, i.e., communication that is likely to occur within the traffic situation. Once the traffic situations are predicted, they may be used to predict the communication they are likely to generate (e.g., the communication between the road users and between road users and the backend). In at least some disclosed embodiments, the information related to the prediction of the communication links between the road users in the plurality of traffic situations may be determined 150 using a machine-learning algorithm, e.g., using a pre-trained neural network. The information related to the plurality of traffic situations may be used as input to the machine-learning algorithm.

Each communication may also be associated with radio resources that are required for the communication. The method may further comprise determining information 160 related to radio resources required for the predicted communication links based on the information related to the prediction of the communication links. For example, the radio resources may comprise at least one of information related to a required data throughput of the predicted communication links, information related to a required data volume of the predicted communication links, information related to an amount of resource blocks required for the predicted communication links, information related to an amount of frequency and/or time resources required for the predicted communication links and information related to spatial resources required for the predicted communication links. To determine the radio resources that are required for the predicted communication links, the method may determine the services that are likely to be used by the road users in the traffic situations. In other words, the method may, as further shown in FIG. 1b, comprise determining 162 information related to vehicular communication services (i.e., connected transportation vehicle communication services, or short connected services) that are required by road users that are involved in the plurality of traffic situations. For example, a vehicular communication service may be a service that is provided to a road user (of the plurality of road users or the further plurality of road users) by a further road user or by a backend service via V2V or V2N communication. The vehicular communication service may relate to a traffic situation of the plurality of traffic situations. For example, a remote driving service that is provided by (or via) a backend server in an example of a vehicular communication service. Another example is a platooning communication service. A third example is a vehicular communication service that aims at aiding in the left turning of a road user, e.g., by giving way to the turn-taker. The information related to the radio resources required for the predicted communication links may be determined 160 based on the information related to the vehicular communication services that are required by the road users that are involved in the plurality of traffic situations. For example, each vehicular communication service may be associated with radio resources that are required for the vehicular communication service.

To determine the vehicular communication services that are required by road users that are involved in the plurality of traffic situations, the method may employ various metrics. For example, the determination of the information related to vehicular communication services that are required by road users that are involved in the plurality of traffic situations may comprise one or more elements of a group of a determination 164 of the road users that are involved in the plurality of traffic situations and a determination 166 of vehicular communication services that are required by the road users that are involved in the plurality of traffic situations. Additionally, to be able to determine spatial radio resources required for the predicted communication links, the determination of the information related to vehicular communication services that are required by road users that are involved in the plurality of traffic situations may comprise a determination 168 of a time and place of the vehicular communication services that are required by the road users that are involved in the plurality of traffic situations. The method may comprise providing information related to the vehicular communication services that are required by road users that are involved in the plurality of traffic situations to a road user, e.g., via the mobile radio network (e.g., the mobile communication system), at a suitable update rate and/or upon request of the road user.

In at least some examples, to determine an estimated amount of the required radio resources, each communication of the predicted communication links may be associated with information related to a desired QoS of the communication, which may indicate the radio resources minimally, typically and/or maximally required for the communication, e.g., a maximal delay or a minimal required data throughput. This information may be used to estimate the required radio resources. For example, the method may comprise determining 170 a desired quality of service for the predicted communication links. The desired quality of service may comprise information related to the radio resources minimally, typically and/or maximally required for the predicted communication links. The resources required for the predicted communication may be determined based on the desired quality of service for the predicted communication links (e.g., derived from the radio resources minimally, typically and/or maximally required for the predicted communication links).

In some examples, the method comprises determining 180 a resource planning of radio resources within the pre-defined area based on the required radio resources. For example, the determining 180 of the resource planning of the radio-resources may correspond to a pre-allocation of radio resources. The method may comprise performing a pre-allocation of radio resources based on the resource planning of radio resources. For example, the determining 180 of the resource planning of the radio resources may further be based on a predicted channel state (i.e., predicted channel state information) on the predicted communication links. In other words, the method may further comprise determining information related to a prediction of communication links to be used for the predicted communication links, e.g., based on the time and place of the vehicular communication services that are required by the road users that are involved in the plurality of traffic situations. The method may comprise predicting a channel state on the predicted communication links, e.g., based on historical data, based on a geography of the pre-defined area and/or based on a distance of communication partners involved in the predicted communication links. The method may further comprise using the resource planning of the radio resources to assign radio resources to the road users involved in the plurality of traffic situations, e.g., via the base station. In at last some disclosed embodiments, the method may comprise adjusting an assignment of radio resources in a dynamic TDD (time division duplex) allocation of the mobile communication system based on the determined resource planning of the radio resources.

In at least some disclosed embodiments, the method may further comprise determining 190 information related to an estimated quality of service of the predicted communication links. The estimated quality of service may be used to adjust the road user communication, e.g., by choosing whether V2V or V2N communication is to be used or by choosing a level of precision or detail to be used for the predicted communication links. The information related to an estimated quality of service of the predicted communication links may be determined 190 based on the predicted communication links, based on information related to available radio resources within the pre-defined area, and based on predicted channel state information on the predicted communication links between the road users within the pre-defined area. The information related to the available radio resources may correspond to or may be based on the predicted channel state on the predicted communication links of the predicted communication links.

The at least one interface 12 may correspond to one or more inputs and/or outputs for receiving and/or transmitting information, which may be in digital (bit) values according to a specified code, within a module, between modules or between modules of different entities.

In disclosed embodiments the control module 14 may be implemented using one or more processing units, one or more processing devices, any method or mechanism for processing, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

More details and aspects of the method and/or apparatus 10 are mentioned in connection with the proposed concept or one or more examples described above or below (e.g., FIG. 2 or 3). The method and/or apparatus 10 may comprise one or more additional optional features corresponding to one or more aspects of the proposed concept or one or more examples described above or below.

Disclosed embodiments provide environmental perception for prediction of connected services. At least some disclosed embodiments are based on fusing perceived environment models in road users (which may be comprised in Cooperative Perception Messages, CPM, and which may correspond to the plurality of environmental perception models as introduced in connection with FIGS. 1a to 1c), their planned maneuvers (which may be comprised in Maneuver Coordination Messages, MCM, and which may correspond to the information related to the plurality of planned maneuvers), their routes (which may correspond to the information related to a plurality of planned routes) and/or environmental models perceived by the infrastructure (e.g., the plurality of environmental perception models obtained from the plurality of road-side infrastructure entities, such as camera perception on a crossing) to generate a global perception model (GPM, which may correspond to the combined environmental perception model). The GPM may map the road users on locations and time horizon (e.g., the plurality of points in time), which allows for a prediction of road traffic situations (PRTS, which may correspond to the plurality of traffic situations). The PRTS may be used to determine the required services (e.g., the information related to vehicular communication services that are required by road users that are involved in the plurality of traffic situations) and cluster of road users (e.g., the grouping of the plurality of road users into a plurality of clusters, such as clusters of road users, bicycles, motorcycle, etc.) (PSC). The PSC may be further exploited to manage connected services and clusters of road users, e.g., pre-booking of connected services, register and de-register of road users using connected services and dynamic management of cluster building. Furthermore, the communication links between the road users may be identified (e.g., the information related to a prediction of communication links between road users in the plurality of traffic situations) thanks to the predicted services and the pre-known service implementations, e.g., service enabled via direct communications or via V2N communications. This information "characterized predicted services and clusters" (CPSC) may be provided to predict the channel state (PCS) on the predicted communication links with consideration of the GPM. The predicted channel state (PCS) on the communications links may be further deployed for pre-allocation of radio resources (e.g., in the determining of the resource planning of radio resources) to the communications links between the road users in the clusters using the connected services. Based on the predicted resources (PR), so what is feasible to allocated, the PR and the PCS may be used to predict the quality of service (e.g., by determining the information related to an estimated quality of service of the predicted communication links) on the communication links in the road users clusters using the predicted connected services.

Figure 2A:
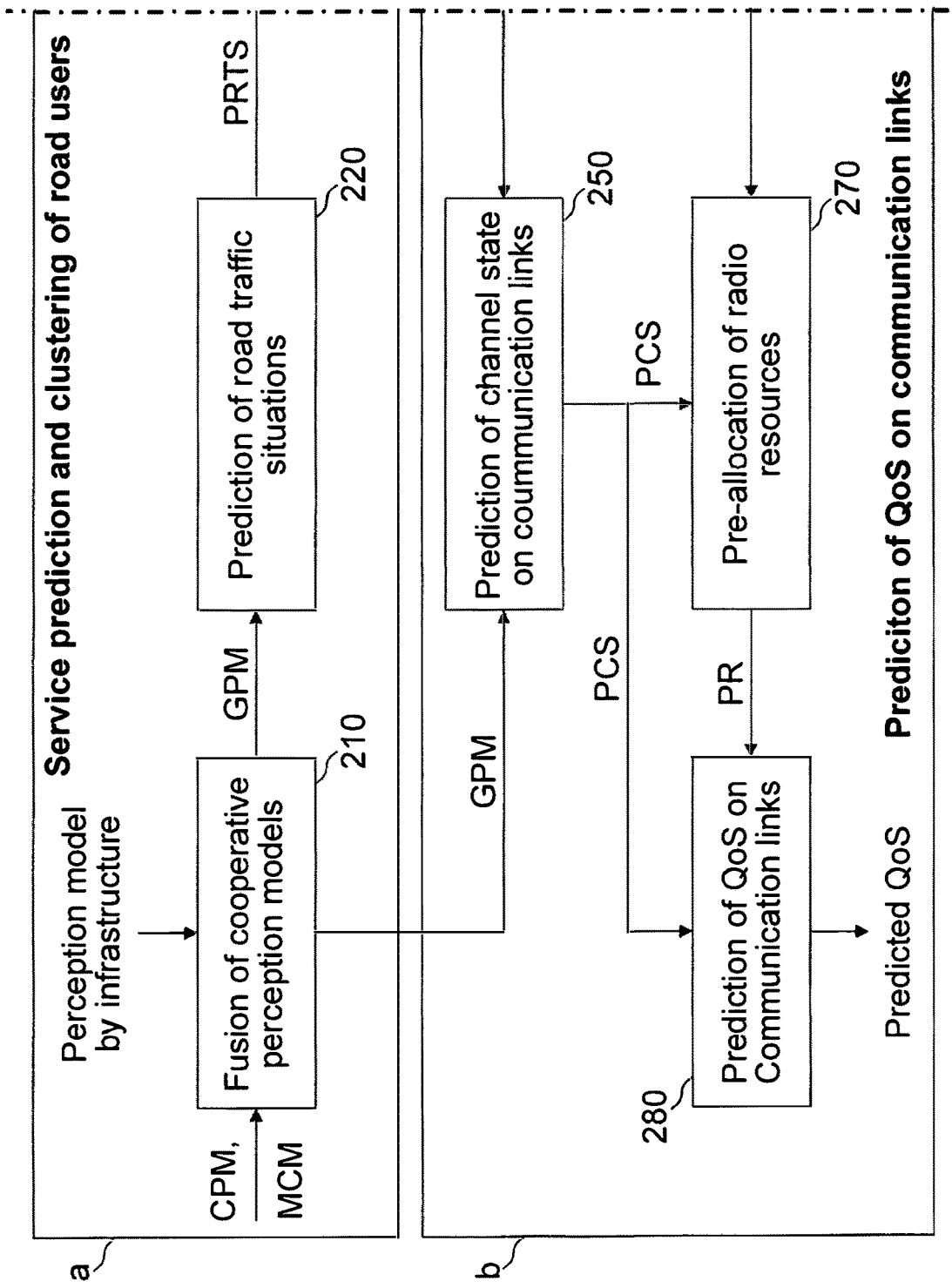

FIG. 2 shows a schematic diagram of an information flow in a service prediction and clustering of road users and of a prediction of quality of service on communication links according to an example. FIG. 2 shows two aspects of a the same information flow, the aspect a) Service prediction and clustering of road users, and the aspect b) Prediction of QoS on communication links. In the service prediction and clustering of road users, the CPM, the MPM and the perception model by infrastructure may be used in a "Fusion of cooperative perceptions models" 210, which may fuse the environmental perception models (i.e., the perceived environmental models) of the road users and of the road-side infrastructure entities with the planned maneuvers, and which may result in the GPM. The GPM may be used as input in a "Prediction of road traffic situations" 220, which may result in the PRTS. The PRTS may be used to "Determine connected services and clusters of road users" 230, which may result in the PSC. The PSC may be used in the "Management of characterization of predicted connected services and clusters" 240, which may result in the CPSC. In the prediction of the QoS on the communication links, the CPSC may be used, along with the GPM, in a "Prediction of channel state on communication links" (PCS) 250, and in a "Prediction of QoS requirements on the communication links" 260, which may be used, along with the PCS, in a "Pre-allocation of radio resources" 270 (PR). The PR and the PCS may be used in a "Prediction of QoS on Communication links" 280, which may yield the predicted QoS.

Disclosed embodiments may provide a high-level architecture for the prediction of connected services using environmental information perceived by transportation vehicles and road infrastructure. The architecture may allow for a pre-allocation of radio resources required on the radio links to enable the operation of the predicted connected services, like platooning or cooperative collision avoidance, between transportation vehicles and transportation vehicles and other road users. The focus may be set on vehicle-to-vehicle (V2V) and vehicle-to-network (V2N) links. Further, disclosed embodiments may show how the prediction of connected services and the pre-allocation of radio resources may enable prediction of quality-of-service (QoS) on the communication links.

Disclosed embodiments may provide a system Architecture for Prediction of Quality-of-Service The connection of automated transportation vehicles on public and private roads allows for safe, efficient and comfortable operation of automated driving transportation vehicles. It may enable connected services like cooperative collision avoidance, vulnerable road user protection and other use cases with complex interactions. These connected services may put stringent requirements on availability of future radio resources and hence on corresponding scheduling algorithms for V2V and V2N communication links. The efficiency of pre-allocation of radio resources may be enhanced in case the QoS requirements of connected services are known ahead of time at schedulers at the mobile radio network. FIG. 3 depicts the proposed architecture, which may comprise the following components:

- Mobile radio network (reference sign 320 of FIG. 3, e.g., the mobile communication system): It may refer to a 3GPP mobile radio network based on Release 16 and beyond.
- Transportation vehicle (reference sign 310 of FIG. 3, e.g., a road user of the plurality of road users): It may denote an automated transportation vehicle of automation levels L3-L5.
- Road infrastructure (reference sign 340 of FIG. 3, e.g., the plurality of road-side infrastructure entities): It may denote the sum of road traffic management and monitoring systems, like traffic lights, monitoring cameras and the road traffic servers.
- Road traffic ecosystem (reference sign 330 of FIG. 3, e.g., the stationary entity of the mobile communication system executing the method of FIG. 1a/1b and/or comprising the apparatus 10 of FIG. 1c): It may denote an ecosystem that may be able to predict connected services, clusters of road users and to manage them temporally and spatially. It may continuously receive cooperative perception messages (CPM) from road transportation vehicles and from the road infrastructure and may be aware of the planned routes and planned manoeuvers of the transportation vehicles as well.

Figure 3:
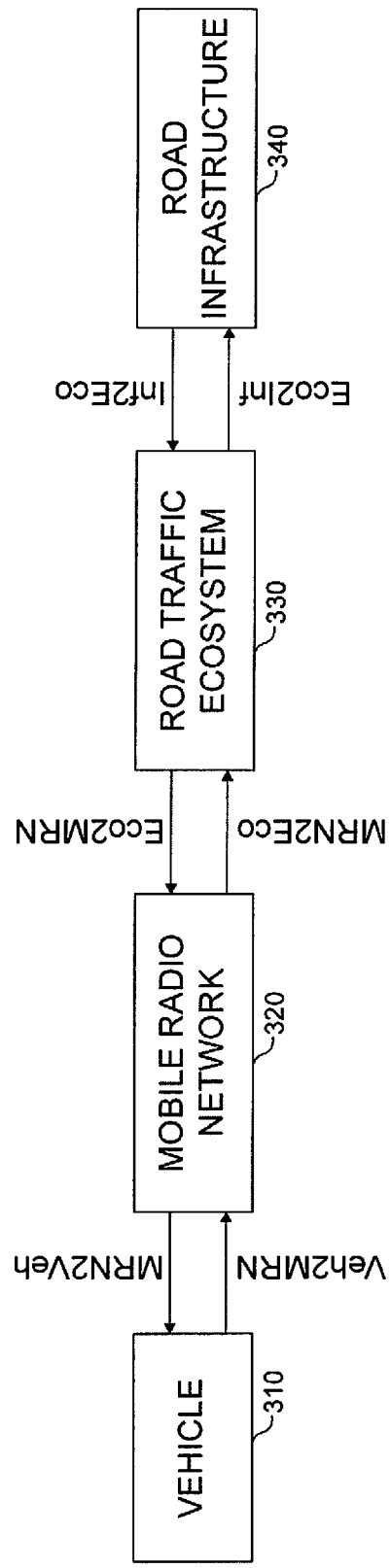
FIG. 3 shows a block diagram of an embodiment of an architecture for a prediction of connected services and QoS on V2V and V2N links.

FIG. 3 shows a block diagram of a disclosed embodiment of an architecture for a prediction of connected services and QoS on V2V and V2N links. FIG. 3 shows the entities transportation vehicle 310 (e.g., a transportation vehicle of the plurality of transportation vehicles), Mobile Radio Network 320 (e.g., the mobile communication system 300), Road Traffic Ecosystem 330 (e.g., the stationary entity of the mobile communication system executing the method of FIGS. 1a/1b and/or comprising the apparatus 10 of FIG. 1c), and Road Infrastructure 340 (e.g., a road-side infrastructure entity of the plurality of road-side infrastructure entities). The interfaces between the architecture components are described in the following and are listed according to their chronological occurrence in the message flow of the prediction procedure Veh2MRN denotes an interface/message between transportation vehicle 310 and mobile radio network 320. This interface may provide the predicted QoS request interface between the transportation vehicle and the mobile radio network.

MRN2Eco denotes an interface/message between the mobile radio network 320 and the road traffic ecosystem 330. It may provide a request for prediction of connected services and for a global environmental perception along the planned route of the requesting transportation vehicle with a suitable update rate.

Eco2Inf denotes an interface/message between road traffic ecosystem 330 and road infrastructure 340. It may describe a request for environment perception using installed perception sensors at the infrastructure side. The environment perception may be referenced by the planned route of the requesting transportation vehicle. The request may specify an update rate of the perception information.

Inf2Eco denotes an interface/message between the road infrastructure 340 and the road traffic ecosystem 330. A message transmitted over this interface may include (all) static and dynamic objects perceived by the infrastructure sensors along the planned route of the requesting transportation vehicle (e.g., the plurality of environmental perception models obtained from the plurality. It may correspond to an environmental perception model. These objects may be encapsulated in CPMs. The information may be updated according requested update rate.

Eco2MRN denotes an interface/message between the road traffic ecosystem 330 and the mobile radio network 320. This message may denote the response of the road traffic ecosystem to the mobile radio network. This may include predicted connected services along the planned route of the requesting transportation vehicle. Each predicted connected service may be mapped into a list or data structure of clusters of road users (transportation vehicles, pedestrians, motorbikes, etc.) along the route. A list of V2N and V2V links (e.g., the predicted communication links) with corresponding QoS requirements may be assigned to the predicted clusters. The communication links may be specified based on available a-priori information about the radio implementation of the predicted connected services. The predicted communication links may in turn be mapped into the road segments (e.g., the pre-defined area) and the future time spans (e.g., the points of time in the future) where/when the connected services are expected to be exploited by the clustered road users. The prediction may be carried out based on the fusion of CPMs (e.g., the plurality of environmental perception models) collected by transportation vehicles in the vicinity of the planned route and by the road infrastructure perception sensors. The fusion of CPMs may result into a global perception model (GPM), e.g., the combined environmental perception model, which may depict (all) static and dynamic objects in temporal and spatial domains along the route of the requesting transportation vehicle/road user. The predicted information may be supplemented by a confidence indicator, which may vary along the planned route. The confidence indicator may depend on the uncertainties of the environment perception. The horizon of the prediction may be determined by the temporal and spatial characteristics of the planned route of the requesting transportation vehicle.

Furthermore, the response may include the GPM assigned to the route of the requesting transportation vehicle. The GPM may be sent according to the specified periodicity rate. The mobile radio network may exploit the GPM to predict the channel states on the communication links between road users using a predicted connected service. The knowledge of the predicted channel states, e.g., the channel estimates, and the QoS requirements on the V2N and V2V links may allow for reliable pre-allocation of resources with consideration of the feasible modulation and coding schemes on the radio links. In case of lack of radio resources, the QoS level on the communication links may be predicted based on the predicted channel states, the available resources and the modulation and coding schemes.

Mrn2Veh denotes an interface/message between the mobile radio network 320 and the transportation vehicle. It may specify the response interface for predicted QoS between the mobile radio network and the transportation vehicle. Furthermore, it may include a list of connected services, the transportation vehicle is registered to in temporal and spatial domains along the planned route.

The Road traffic ecosystem may be implemented by OEMs with own ecosystems, like transportation vehicle manufacturers. It may be very convenient to connect the different ecosystems of different OEMs to allow for cross-OEMs interoperability. The Road infrastructure may be implemented by road authorities or a third party, which may be interested in business models with the OEMs by supporting them with CPM from the infrastructure. The Mobile radio network may be implemented by the mobile radio operators. And the transportation vehicle may be managed by the OEMs.

The complexity may consist in the specification of the interfaces between the different system components. The interfaces may at least partially be based on Interfaces for an exchange of QoS information in automotive use cases, which may provide or specify the predictive QoS interface between the transportation vehicle/UE and the mobile radio network.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles, aspects, and embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having a method or mechanism for performing each of the respective operations of these methods.

LIST OF REFERENCE SIGNS

10 Apparatus
12 At least one interface
14 Control module
100 Computing entity
110 Obtaining a plurality of environmental perception models
112 Obtaining information related to a plurality of planned maneuvers
114 Obtaining information related to a plurality of routes
120 Generating a combined environmental perception model
130 Predicting a plurality of traffic situations
140 Grouping a plurality of road users
150 Determining information related to a prediction of communication links
160 Determining information related to radio resources required for the predicted communication links
162 Determining information related to vehicular communication services that are required by road users that are involved in the plurality of traffic situations
164 Determination of the road users that are involved in the plurality of traffic situations
166 Determining of vehicular communication services that are required by the road users that are involved in the plurality of traffic situations
168 Determination of a time of place of the vehicular communication services that are required by the road users that are involved in the plurality of traffic situations
170 Determining a desired quality of service for the predicted communication links
180 Determining a resource planning
190 Determining information related to an estimated quality of service of the predicted communication
200a Service prediction and clustering of road users
200b Prediction of QoS on communication links
210 Fusion of cooperative perceptions models
220 Prediction of road traffic situations
230 Determine connected services and clusters of road users
240 Management of characterization of predicted connected services and clusters
250 Prediction of channel state on communication links
260 Prediction of QoS requirements on the communication links
270 Pre-allocation of radio resources
280 Prediction of QoS on Communication links
310 Transportation vehicle
320 Mobile radio network
330 Road traffic ecosystem
340 Road infrastructure

The invention claimed is:

1. An apparatus for predicting a plurality of traffic situations, the apparatus comprising:
a computing entity located at a base station of a mobile communication system, the computing entity including:
at least one interface for communicating with a plurality of transportation vehicles and with a plurality of road-side infrastructure entities, and
a control module configured to:
receive a first plurality of environmental perception models from the plurality of transportation vehicles and receive information related to a plurality of planned routes of the plurality of transportation vehicles, wherein the plurality of planned routes correspond to a predefined area,
request a second plurality of environmental perception models, from the plurality of road-side infrastructure entities via the at least one interface, based on information derived from the received first plurality of environmental perception models and the received information related to the plurality of planned routes, wherein the received second plurality of environmental perception models are associated with the predefined area, and wherein the request includes a desired update rate for the second plurality of environmental perception models,
generate a combined environmental perception model for the predefined area by fusing the first plurality of environmental perception models and the second plurality of environmental perception models within the combined environmental perception model, wherein the generated combined environmental perception model is along at least one of the plurality of planned routes, and wherein the combined environmental perception model models a position and movement of each of the plurality of transportation vehicles within the predefined area over a plurality of points in time in the future,
predict a plurality of traffic situations within the predefined area and along the at least one of the plurality of planned routes over the plurality of points in time in the future based on the combined environmental perception model, wherein at least one of the plurality of predicted traffic situations includes a change in the position and movement of at least two of the plurality of transportation vehicles relative one another, and
predict communication links of the transportation vehicles in the plurality of predicted traffic situations over the plurality of points in time in the future, wherein the predicted communication links include communication links predicted to form between the at least two of the plurality of transportation vehicles based on the at least one of the plurality of predicted traffic situations,
determine communication network resources necessary to support the predicted communication links between the transportation vehicles in the plurality of predicted traffic situations, and
pre-allocate the communication network resources determined necessary to support the predicted communication links between the plurality of transportation vehicles in the plurality of predicted traffic situations in the future.

2. The apparatus of claim 1, wherein the control module is further configured to obtain information related to a plurality of planned maneuvers of the plurality of transportation vehicles, wherein the combined environmental perception model is generated based on the information related the plurality of planned maneuvers.

3. The apparatus of claim 1, wherein the plurality of environmental perception models comprise modeling information for an area surrounding the plurality of transportation vehicles, wherein the modeling information relates to objects that have been identified by the plurality of transportation vehicles using perception sensors of the plurality of transportation vehicles.

4. The apparatus of claim 1, wherein the control module is further configured to group the plurality of transportation vehicles into a plurality of clusters of transportation vehicles based on the plurality of predicted traffic situations.

5. The apparatus of claim 1, wherein the control module is further configured to determine information related to radio resources required for the predicted communication links based on the information related to the prediction of the communication links.

6. The apparatus of claim 5, wherein the control module is configured to determine information related to vehicular communication services required by transportation vehicles that are involved in the plurality of predicted traffic situations, wherein the information related to the radio resources required for the predicted communication links is determined based on the information related to the vehicular communication services that are required by the transportation vehicles that are involved in the plurality of predicted traffic situations.

7. The apparatus of claim 5, wherein the control module is configured to perform resource planning of radio resources within the predefined area based on the required radio resources.

8. The apparatus of claim 1, wherein the predicted communication links between the transportation vehicles in the plurality of predicted traffic situations comprises vehicle-to-vehicle-communication links and vehicle-to-network-communication links.

9. The apparatus of claim 8, wherein the control module is configured to determine information related to an estimated quality of service of the predicted communication links based on information related to available radio resources within the predefined area and based on predicted channel state information on the predicted communication links between the transportation vehicles within the predefined area.

10. The apparatus of claim 1, wherein the information related to the prediction of the communication links of the transportation vehicles in the plurality of predicted traffic situations is determined using a machine-learning algorithm, wherein information related to the plurality of predicted traffic situations is used as input to the machine-learning algorithm.

11. The apparatus of claim 1, wherein at least a portion of a coverage area of the base station overlaps with the predefined area.

12. A method for predicting a plurality of traffic situations, the method comprising:
receiving, by a computing entity located at a base station of a mobile communication system, a first plurality of environmental perception models from a plurality of transportation vehicles and receiving information related to a plurality of planned routes of the plurality of transportation vehicles, wherein the plurality of planned routes correspond to a predefined area,
requesting, by the computing entity, a second plurality of environmental perception models, from a plurality of road-side infrastructure entities, based on information derived from the received first plurality of environmental perception models and the received information related to the plurality of planned routes, wherein the received second plurality of environmental perception models are associated with the predefined area, and wherein the request includes a desired update rate for the second plurality of environmental perception models;
generating a combined environmental perception model for the predefined area by fusing the first plurality of environmental perception models and the second plurality of environmental perception models within the combined environmental perception model, wherein the generated combined environmental perception model is along at least one of the plurality of planned routes, and wherein the combined environmental perception model models a position and movement of each of the plurality of transportation vehicles within the predefined area over a plurality of points in time in the future;
predicting a plurality of traffic situations within the predefined area and along the at least one of the plurality of planned routes over the plurality of points in time in the future based on the combined environmental perception model, wherein at least one of the plurality of predicted traffic situations includes a change in the position and movement of at least two of the plurality of transportation vehicles relative one another;
predicting communication links of transportation vehicles in the plurality of predicted traffic situations over the plurality of points in time in the future, wherein the predicted communication links include communication links predicted to form between the at least two of the plurality of transportation vehicles based on the at least one of the plurality of predicted traffic situations;
determining communication network resources necessary to support the predicted communication links between the transportation vehicles in the plurality of predicted traffic situations; and
pre-allocating the communication network resources determined necessary to support the predicted communication links between the transportation vehicles in the plurality of predicted traffic situations in the future.

13. The method of claim 12, further comprising obtaining information related to a plurality of planned maneuvers of the plurality of transportation vehicles, wherein the combined environmental perception model is generated based on the information related the plurality of planned maneuvers.

14. The method of claim 12, wherein the plurality of environmental perception models comprise modeling information for an area surrounding the plurality of transportation vehicles, wherein the modeling information relates to objects that have been identified by the plurality of transportation vehicles using perception sensors of the plurality of transportation vehicles.

15. The method of claim 12, further comprising:
grouping the plurality of transportation vehicles into a plurality of clusters of transportation vehicles based on the plurality of predicted traffic situations.

16. The method of claim 12, further comprising:
determining information related to radio resources required for the predicted communication links based on the information related to the prediction of the communication links.

17. The method of claim 16, further comprising determining information related to vehicular communication services required by transportation vehicles that are involved in the plurality of predicted traffic situations, wherein the information related to the radio resources required for the predicted communication links is determined based on the information related to the vehicular communication services that are required by the transportation vehicles that are involved in the plurality of predicted traffic situations.

18. The method of claim 16, further comprising performing resource planning of radio resources within the predefined area based on the required radio resources.

19. The method of claim 12, wherein the predicted communication links between the transportation vehicles in the plurality of predicted traffic situations comprises vehicle-to-vehicle-communication links and vehicle-to-network-communication links.

20. The method of claim 12, further comprising determining information related to an estimated quality of service of the predicted communication links based on information related to available radio resources within the predefined area and based on predicted channel state information on the predicted communication links between the transportation vehicles within the predefined area.

21. The method of claim 12, wherein the information related to the prediction of the communication links of the transportation vehicles in the plurality of predicted traffic situations is determined using a machine-learning algorithm, wherein information related to the plurality of predicted traffic situations is used as input to the machine-learning algorithm.

22. The method of claim 12, wherein a coverage area of the base station at least partially overlaps with a part of the predefined area.

23. A system for a transportation vehicle, the system comprising:
a computer, a processor, or a programmable hardware component configured to
receive a first plurality of environmental perception models, from a plurality of transportation vehicles, wherein the first plurality of environmental perception models includes information related to and receive information related to a plurality of planned routes of the plurality of transportation vehicles, wherein the plurality of planned routes correspond to a predefined area,
request a second plurality of environmental perception models, from a plurality of road-side infrastructure entities, based on information derived from the received first plurality of environmental perception models and the received information related to the plurality of planned routes, wherein the received second plurality of environmental perception models are associated with the predefined area, and wherein the request includes a desired update rate for the second plurality of environmental perception models,
generate a combined environmental perception model for the predefined area by fusing the first plurality of environmental perception models and the second plurality of environmental perception models within the combined environmental perception model, wherein the generated combined environmental perception model is along at least one of the plurality of planned routes, and wherein the combined environmental perception model models a position and movement of each of the plurality of transportation vehicles within the predefined area over a plurality of points in time in the future,
predict a plurality of traffic situations within the predefined area and along the at least one of the plurality of planned routes over the plurality of points in time in the future based on the combined environmental perception model, wherein at least one of the plurality of predicted traffic situations includes a change in the position and movement of at least two of the plurality of transportation vehicles relative one another,
predict communication links of the transportation vehicles in the plurality of predicted traffic situations over the plurality of points in time in the future, wherein the predicted communication links include communication links predicted to form between the at least two of the plurality of transportation vehicles based on the at least one of the plurality of predicted traffic situations,
determine communication network resources necessary to support the predicted communication links between the transportation vehicles in the plurality of predicted traffic situations, and
pre-allocate the communication network resources determined necessary to support the predicted communication links between the plurality of transportation vehicles in the plurality of predicted traffic situations in the future.

* * * * *